United States Patent
Zhai

(10) Patent No.: US 8,630,246 B2
(45) Date of Patent: Jan. 14, 2014

(54) TECHNIQUES FOR IMPROVING THE SPATIAL REUSE OF WIRELESS NETWORKS

(75) Inventor: Hongqiang Zhai, Ossining, NY (US)

(73) Assignee: Koninklijke Philips N.V., Eindhoven (NL)

( * ) Notice: Subject to any disclaimer, the term of this patent is extended or adjusted under 35 U.S.C. 154(b) by 301 days.

(21) Appl. No.: 12/990,658

(22) PCT Filed: May 12, 2009

(86) PCT No.: PCT/IB2009/051959
§ 371 (c)(1),
(2), (4) Date: Nov. 2, 2010

(87) PCT Pub. No.: WO2009/141761
PCT Pub. Date: Nov. 26, 2009

(65) Prior Publication Data
US 2011/0044280 A1    Feb. 24, 2011

Related U.S. Application Data

(60) Provisional application No. 61/054,263, filed on May 19, 2008, provisional application No. 61/176,991, filed on May 11, 2009.

(51) Int. Cl.
*H04W 4/00*    (2009.01)
(52) U.S. Cl.
USPC ......... 370/329; 455/403; 455/422.1; 455/450

(58) Field of Classification Search
USPC ......... 370/310, 328–334, 337–338, 347, 478; 455/422.1–466
See application file for complete search history.

(56) References Cited

U.S. PATENT DOCUMENTS

| | | |
|---|---|---|
| 2005/0111383 A1 | 5/2005 | Grob |
| 2006/0114826 A1* | 6/2006 | Brommer ...................... 370/230 |
| 2007/0214286 A1* | 9/2007 | Muqattash et al. ........... 709/248 |

OTHER PUBLICATIONS

ETSI: "High Rate Ultra Wideband PHY and MAC Standard [ECMA-368/Dec. 2005, modified ED. 1" Internet Citation, Dec. 2005, pp. 1-39, XP002496814 Retrieved from the Internet: URL : http ://pda.ets i.org/pda/AQuery.asp> retrieved on Sep. 22, 2008].

Acharya A; Misra A; Bansal S: "Design and Analysis of a Cooperative Medium Access Scheme for Wireless Mesh Networks", Broadband Networks, 2004. First International Conference on San Jose, CA, USA Oct. 25-29, 2004, Piscataway, NJ, USA,IEEE, Oct. 25, 2004, pp. 621-631, XP010750342.

* cited by examiner

*Primary Examiner* — Charles C Jiang
(74) *Attorney, Agent, or Firm* — Larry Liberchuk

(57) ABSTRACT

A method (400) for improving the spatial reuse of a wireless network, comprising selecting a medium access slot (MAS) type for scheduling concurrent transmissions in the wireless network (S410); assigning reservations to the selected MAS (S420); and applying the selected MAS to source nodes and sink nodes of the wireless network (S430).

17 Claims, 4 Drawing Sheets

| Length IE | Control IE | DRP MAS Status Bitmap IE | MAS Timing IE |
|---|---|---|---|
| 540 | 520 | 510 | 530 |

TECHNIQUES FOR IMPROVING THE SPATIAL REUSE OF WIRELESS NETWORKS

This application claims the benefit of U.S. Provisional Application No. 61/054,263 filed on May 19, 2008, the contents of which are herein incorporated by reference.

The invention relates generally to block transmission techniques.

In wireless networks, nodes located at a distance from each other can successfully transmit at the same time on the same frequency. This ability is typically referred to as spatial reuse. Spatial reuse is an important feature for wireless networks to support multiple concurrent transmissions, thereby enabling an increase in the network throughput.

The spatial reuse is further described with reference to FIG. 1 which shows a WiMedia based wireless network 100 that includes ten nodes 110-1 through 110-10. Each node 110-X (X is an integer greater than or equal to 1) may be either in a sink mode, source mode, or idle mode. A node 110-X operating in a source mode (hereinafter "source node") transmits DATA and request to send (RTS) frames and receives clear to send (CTS) and acknowledgment (ACK) frames. A node 110-X operating in a sink mode (hereinafter "sink node") transmits ACK and CTS frames and receives RTS frames. A node 110-X in an idle mode (hereinafter "idle node") neither receives nor transmits frames.

The network 100 operates according to the WiMedia standard specification, which governs several rules with regard to concurrent transmissions. One of the rules determines that neighbouring nodes of a source node 110-X and a sink node 100-Y (Y is an integer greater than or equal to 1) are idle nodes. That is, neighbours of transmitting nodes cannot transmit any frames and neighbours of receiving nodes cannot receive frames. For example, applying this rule in the wireless network 100 implies that the spatial reuse is limited only to two pairs of nodes 110-1 and 110-2, as well as 110-7 and 110-8, where 110-1 and 110-7 are source nodes. Obviously, this significantly reduces the throughput of the network 100.

A distributed reservation protocol (DRP), defined as part of the WiMedia MAC specification, provides a mechanism for concurrent communications between nodes 110-X. Specifically, the DRP enables a device to gain scheduled access to the wireless medium within a negotiated reservation. Generally, a reservation type may be a hard reservation or a soft reservation. In hard reservations, nodes 110-X other than the reservation owner and target(s) are not allowed to transmit frames. In soft reservations, neighbours of a reservation target that are not neighbours of the reservation owner are not allowed to access the wireless medium. For all kinds of transmissions, neighbours of a source node 110-X are not allowed to transmit MAC frames.

Simply canceling the concurrent transmissions rules and the reservation provisions of the DRP will not improve the performance of the network as frames may collide at some nodes for the reason that the transmission is often bi-directional. That is, ACK frames sent from a sink node 100-Y and DATA frames sent from a source node 110-X will probably collide.

Certain embodiments of the invention include a method for improving the spatial reuse of a wireless network. The method comprises selecting a medium access slot (MAS) type for scheduling concurrent transmissions in the wireless network; assigning reservations to the selected MAS; and applying the selected MAS to source nodes and sink nodes of the wireless network.

Certain embodiments of the invention also include a computer readable medium having stored thereon computer executable code. The execution of the code causing a computer to perform the process of: selecting a medium access slot (MAS) type for scheduling concurrent transmissions in the wireless network; assigning reservations to the selected MAS; and applying the selected MAS to source nodes and sink nodes of the wireless network.

The invention further includes a wireless network adapted for enabling concurrent transmissions. The wireless network comprises a plurality of source nodes for transmitting at least DATA frames according to a predefined medium access slot (MAS) type and according to pre-assigned reservations; and a plurality of sink nodes for receiving at least DATA frames according to a predefined MAS type and according to the pre-assigned reservations.

The invention also includes a DRP information element data structure adapted to improve the spatial reuse of wireless networks. The DRP information element includes a DRP availability status bitmap information element including at least a medium access slot (MAS) type to be used; a control element for describing the content in the DRP information element; a MAS timing information element for supporting any type of MAS; and a length element including the length of the DRP availability status bitmap information element, the control element, and the MAS timing information element.

The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

Figure 1:
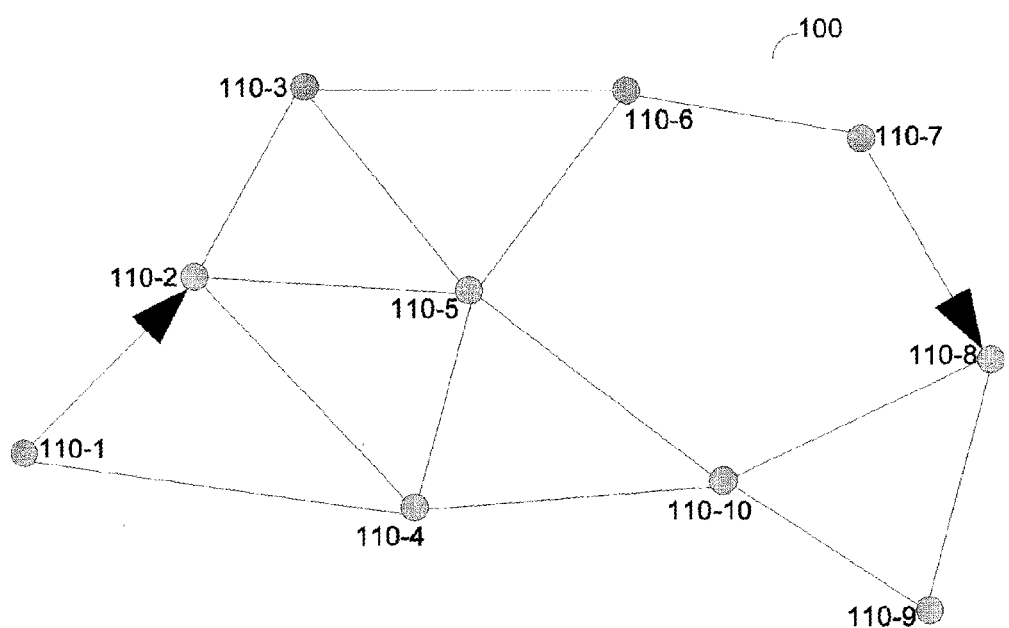
FIG. 1 is a schematic diagram of a WiMedia based wireless network.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

The present invention is useful in spatial reuse of wireless networks and particularly of WiMedia based wireless networks by providing a new medium access slot (MAS) scheduling transmission mechanisms. Accordingly, in certain embodiments a node in the wireless network can only transmit or only receive frames in fixed intervals of the MAS or during the entire MAS.

In order to use the MAS transmission scheduling mechanisms and to avoid collisions of frames when neighboring nodes concurrently transmit, new concurrent transmission rules are defined. The first rule provides that only one sink node can be in each source node's neighborhood, and that there is only one source node in each sink node's neighborhood. The second rule determines that neighboring nodes (i.e., either sink nodes or source nodes) involved in concurrent transmissions in the same MAS must adopt the same MAS type, i.e., follow exactly the same transmission and reception intervals. Accordingly, all source nodes in each other's neighborhood can transmit DATA frames and receive ACK frames at the same time. Similarly, all sink nodes in each other's neighborhood can receive DATA frames and transmit ACK frames at the same time. Therefore, the new concurrent transmission rules are useful in avoiding collisions between DATA frames and ACK frames and increasing successful concurrent transmissions.

Figure 2:
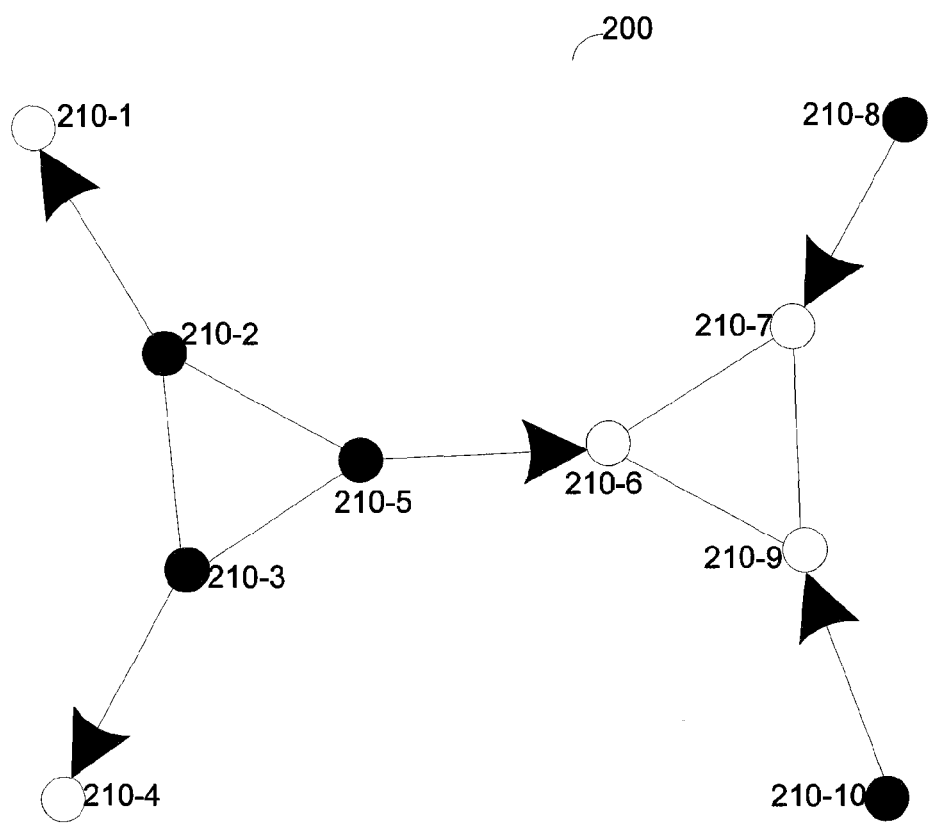
FIG. 2 is a topology of a WiMedia based wireless network useful in explaining certain embodiments of the invention.

FIG. 2 shows a topology of a wireless network 200 demonstrating how the new communication rules may improve the spatial reuse. The network 200 includes ten nodes 210-1 through 210-10 where nodes connected with an edge are neighbors. In accordance with the invention, the optimal spatial reuse is achieved when nodes 210-2, 210-3, 210-5, 210-8 and 210-10 are source nodes and all others are sink nodes. This complies with the first rule mentioned above. For example, the node 210-6 is a sink node as only one sink node can be in the neighborhood of source nodes 210-2, 210-3 and 210-5. The number of concurrent transmissions that can be achieved in such configuration is five, i.e., node 210-2 to node 210-1, node 210-3 to node 210-4, node 210-5 to node 210-6, node 210-8 to node 210-7, and node 210-10 to node 210-9. In comparison to the conventional concurrent transmissions mechanism disclosed in the related art, for such topology no concurrent transmissions are allowed at the same MAS other than transmissions from node 210-5 to node 210-6. Therefore, as shown, this example embodiment significantly improves the spatial reuse.

In accordance with the certain embodiments of the invention, three different types of MASs can be utilized to facilitate the concurrent transmissions. Regardless to its type, a MAS is divided into one or more intervals with predefined lengths. There are two kinds of intervals: a transmission interval and a reception interval. In transmission intervals, source nodes transmit RTS or DATA frames, and sink nodes receive RTS or DATA frames. In reception intervals, sink nodes transmit CTS or ACK frames and source node receive those frames.

Figure 3A:
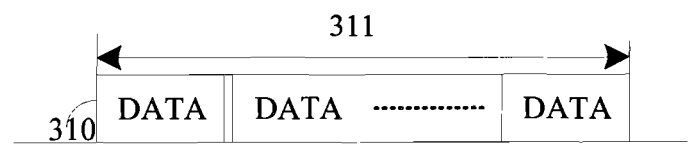
FIGS. 3A, 3B and 3C are diagrams of various MAS types constructed in accordance with certain embodiments of the invention.

FIG. 3A shows an exemplary diagram of a single directional transmission MAS 310 for scheduling concurrent transmissions constructed in accordance with an embodiment of the invention. The MAS 310 includes a single transmission interval 311 and no reception interval. Therefore, when utilizing the MAS 310 for scheduling the transmissions, a source node only transmits DATA frames and a sink node only receives DATA frames. No other medium access is allowed.

Figure 3B:
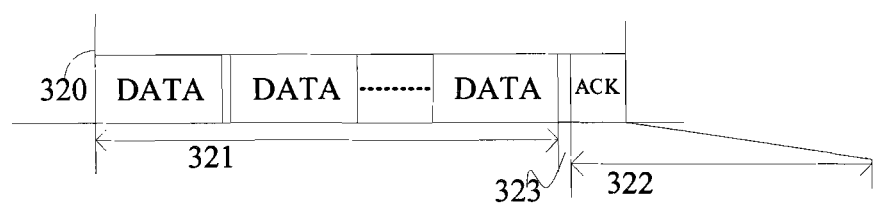

FIG. 3B shows an exemplary diagram of a bi-directional transmission MAS 320 for scheduling concurrent transmissions constructed in accordance with another embodiment of the invention. The MAS 320 is divided into a transmission interval 321 and a reception interval 322. In addition, there is an interval spacing 323 between the intervals 321 and 322 to allow the turnaround from transmitting to receiving and from receiving to transmitting. In the transmission interval 321 a source node transmits DATA frames, and a sink node receives DATA frames. In the reception interval 322 a sink node transmits an ACK frame (may be a block acknowledgement), and a source node receives an ACK frame.

Figure 3C:
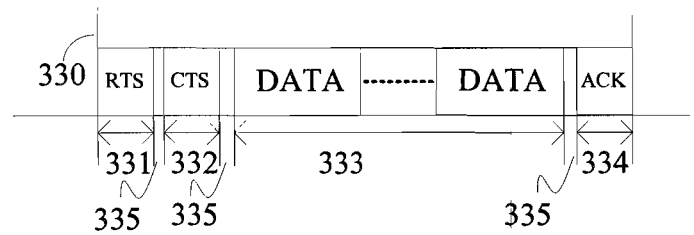

FIG. 3C shows an exemplary diagram of a bi-directional transmission MAS 330 for scheduling concurrent transmissions constructed in accordance with another embodiment of the invention. This type of MAS includes two transmission intervals 331 and 333 and two reception intervals 332 and 334 and in between there are interval spacings 335. Always after a transmission interval there is a reception interval. According to one embodiment of the invention, in the interval 331 a source node transmits a RTS frame and a sink node receives a RTS frame. In the interval 332 a sink node transmits a CTS frame and a source node receives a CTS frame. In the interval 333 a source node transmits DATA frames and a sink node receives DATA frames. In the interval 334 a sink node transmits an ACK frame and a source node receives an ACK frame. It is appreciated that one of ordinary skill in the art can adopt the teachings disclosed herein to define other type of MASs.

For all MAS types described above, the time durations of the transmission, reception, and spacing intervals are predetermined according to the length of the transmitted frames. Specifically, the interval spacing is typically larger than or equal to the maximum value of a guard time interval (e.g., maximum synchronization error, or maximum clock drift among devices and a short inter-frame spacing). The reception intervals are based on the length of the ACK frame and RTS frame. The interval 331 and 332 are based on the lengths of the RTS and CTS frames and are typically fixed.

Figures 4, 5:
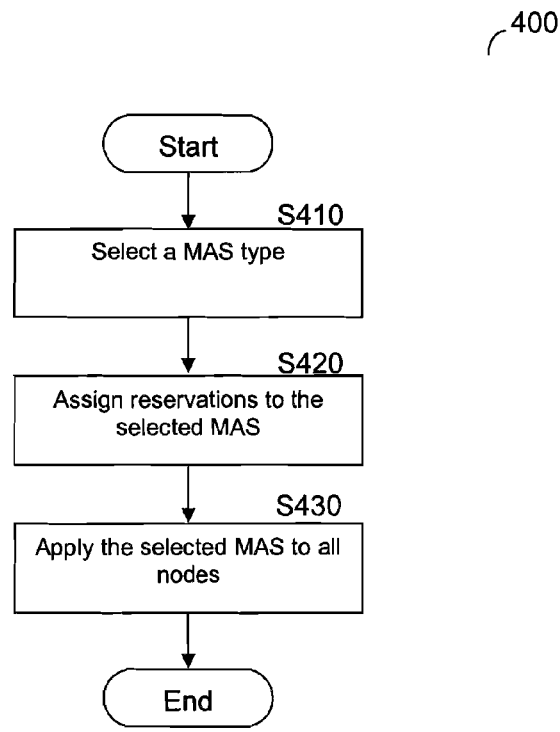
FIG. 4 is a flowchart describing a method in accordance with an embodiment of the invention.
FIG. 5 is a diagram of a modified DRP information element format constructed in accordance with an embodiment of the invention.

FIG. 4 shows an exemplary and non-limiting flowchart 400 describing a method implemented in accordance with an embodiment of the invention. At S410, the type of MAS to be used by the source and sink nodes is selected. The selection is based on a communication application of a wireless network to achieve optimized performance. For example, if the application does not require acknowledgment of frames reception, then MAS 310 is selected. If should be noted that a combination of MASs can be utilized by the nodes. For example, if an ACK frame should be transmitted after DATA frames transmitted within a sequence of MASs, then in such case a combination of MAS 310 and MAS 320 is selected. At S420, reservations are assigned to the selected MAS to allow more concurrent transmissions in each MAS. The assignment of reservations comply with the rule that only one sink node can be in the neighbourhood of a source node and that only one source node can be in the neighbourhood of a sink node. At S430, the selected MAS or combination of MASs are applied to sink and source nodes in the network. It should be noted that idle nodes may or may not adopt the selected MAS type. It should be further noted that during the same MAS, two pairs of source nodes and sink nodes which are far away from each other could use different types of MASs as long as either one of the first pair of source node and sink node is not a neighbor of either one of the second pair of source node and sink node.

In one embodiment of the invention the teachings described herein can be adapted to be included in the WiMedia MAC specification, thereby improving the spatial reuse of WiMedia based wireless networks. To this end, two reserved bits in the DRP control field of the DRP information element (IE) are utilized to designate the type of MAS transmission scheduling. The MAS type may be either one of those described above or the MAS currently adopted by WiMedia standard. This allows backward compatibility with existing WiMedia based devices. In addition, the format of the DRP IE is modified to indicate the status of the MAS. A modified DRP IE data structure 500 is shown in FIG. 5. For each bit set as zero in a DRP availability bitmap of a DRP availability IE, there are two bits allocated in a DRP availability status bitmap IE 510 to designate the MAS type to be used. The DRP IE format 500 also includes a control IE 520, a MAS timing IE 530 and a length IE 540 that designates the length of the elements 510, 520, and 530.

The control IE 520 indicates how to decode the information in the modified DRP IE 500 and includes at least the following fields of information (not shown): a) an indication of whether the control element 520 is used to explain the MAS type of a reservation advertised by the reservation owner and target, or whether the IE 520 is used to explain the MAS type of the MAS availability information advertised by any device; b) an indication of whether all MASs have the same MAS type or not; c) an indication of whether the modified DRP IE 500 is used to explain a single reservation advertisement or all reservation advertisements; d) an indication of whether a device is in the range of a reservation owner or a reservation target; and e) the number of bits used to designate the MAS type.

The MAS timing IE 530 is used for any types of MASs other than the MASs shown in FIGS. 3A, 3B and 3C. To support additional types of MASs, the MAS timing IE 530 describes the locations and lengths of all transmission and reception intervals in a MAS. A pair of source node and sink node can use the MAS timing IE 530 to establish any new type of MASs.

All nodes that use the DRP for transmission or reception announce their reservations by including DRP IEs with the MAS type field in their beacons. In a reservation negotiation, if the reservation cannot be granted due to a conflict with its own or its neighbors' reservations, the reservation target includes a DRP availability IE as well as a DRP MAS status bitmap IE 510 in a DRP reservation response command frame. In a DRP reservation response command frame for a multicast reservation, the reservation target shall include a DRP availability IE as well as a DRP MAS status bitmap IE 510 for a reason code other than denied.

The improved spatial reuse techniques described herein can be implemented in communication systems including, but not limited to, a ultra wideband (UWB) based wireless personal area networks (PANs), WiMedia based wireless networks, or any time division multiple access (TDMA) or super-frame based wireless networks.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

Most preferably, the principles of the invention are implemented as a combination of hardware, firmware and software. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPU"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

I claim:

1. A method for improving spatial reuse of a wireless network, comprising:
    selecting a medium access slot (MAS) for scheduling concurrent transmissions in the wireless network from source nodes to sink nodes of the wireless network;
    assigning reservations to the selected MAS using a concurrent transmission rule, wherein the concurrent transmission rule allows only one source node in a neighborhood of each of the sink nodes, wherein the concurrent transmission rule further requires all neighboring sink nodes and neighboring source nodes to adopt a same type of a MAS transmission; and
    applying the selected MAS to the source nodes and the sink nodes of the wireless network.

2. The method of claim 1, wherein the MAS includes at least one of a single directional transmission MAS and a bi-directional transmission MAS.

3. The method of claim 2, wherein the single directional transmission MAS comprises a single transmission interval for transmitting at least one DATA frame.

4. The method of claim 2, wherein the bi-directional transmission MAS comprises at least one transmission interval and at least one reception interval and at least one spacing interval to separate the at least one transmission interval and the at least one reception interval.

5. The method of claim 4, wherein during the at least one transmission interval at least DATA frames are transmitted from a source node to a sink node, and wherein an acknowledgment (ACK) frame is transmitted from a sink node to a source node.

6. The method of claim 5, further comprising transmitting a request to send (RTS) frame during the at least one transmission interval and transmitting a clear to send (CTS) frame during the at least one reception interval.

7. The method of claim 1, wherein the concurrent transmission rule further allows only one sink node to operate in the neighborhood of each of the source nodes.

8. The method of claim 1, wherein the type of the MAS transmission is designated in a distributed reservation protocol (DRP) information element (IE).

9. The method of claim 8, wherein the DRP information element further comprises:
    a DRP availability status bitmap information element including at least a medium access slot (MAS) to be used;
    a control element for describing the content in the DRP information element data structure and designating the type of the MAS transmission to be adopted by the neighboring nodes;
    a MAS timing information element for supporting any type of MAS; and
    a length element including the length of the DRP availability status bitmap information element, the control information element, and the MAS timing information element.

10. A non-transitory computer readable medium having stored thereon computer executable code for improving spatial reuse in a wireless network, the execution of code causing:
    selecting a medium access slot (MAS) for scheduling concurrent transmissions in the wireless network from source nodes to sink nodes of the wireless network;
    assigning reservations to the selected MAS using a concurrent transmission rule, wherein the concurrent transmission rule allows only one source node in a neighborhood of each of the sink nodes, wherein the concurrent transmission rule further requires all neighboring sink nodes and neighboring source nodes to adopt a same type of a MAS transmission; and
    applying the selected MAS to the source nodes and the sink nodes of the wireless network.

11. A wireless network adapted for enabling concurrent transmissions, comprising:

a plurality of source nodes for transmitting at least one DATA frame according to a predefined medium access slot (MAS) and according to pre-assigned reservations; and a plurality of sink nodes for receiving at least one DATA frame according to a predefined MAS and according to the pre-assigned reservations, wherein the pre-assigned reservations determine that only one source node can operate in a neighborhood of each of the plurality of sink nodes and further determine that all neighboring sink nodes and neighboring source nodes require adoption of a same type of a MAS transmission.

12. The wireless network of claim 11, wherein the source nodes are further capable of receiving ACK frames transmitted from the sink nodes.

13. The wireless network of claim 11, wherein the predefined MAS includes at least one of a single directional transmission MAS and a bi-directional transmission MAS.

14. The wireless network of claim 11, wherein the pre-assigned reservations further determine that only one sink node of the plurality of sink nodes can operate in a neighborhood of each of the plurality of source nodes.

15. The wireless network of claim 11, wherein the wireless network is at least one of: a UWB based wireless personal area network (PAN), a WiMedia based wireless networks, a time division multiple access (TDMA) based wireless network, a super-frame based wireless network.

16. A wireless device configured to generate a distributed reservation protocol (DRP) information element data structure adapted to improve the spatial reuse of wireless networks, comprising:

a processing unit;

a memory connected to the processing unit and configured to store therein a plurality of instructions that when executed by the processing unit generate the DRP information element, wherein the generated DRP information element includes:

a DRP availability status bitmap information element including at least a medium access slot (MAS) to be used;

a control element for describing the content in the DRP information element data structure and designating a type of a MAS transmission to be adopted by neighboring sink nodes and neighboring source nodes;

a MAS timing information element for supporting any type of MAS; and a length element including the length of the DRP availability status bitmap information element, the control information element, and the MAS timing information element.

17. The wireless device of claim 16, wherein the wireless network is at least a WiMedia based wireless network.

* * * * *